United States Patent
Lee et al.

(10) Patent No.: US 12,304,561 B2
(45) Date of Patent: May 20, 2025

(54) STRUCTURE FOR MOUNTING HYDROGEN STORAGE TANKS FOR VEHICLE

(71) Applicants: Hyundai Motor Company, Seoul (KR); Kia Corporation, Seoul (KR)

(72) Inventors: Yong Uk Lee, Hwaseong-si (KR); Seong Jae Shin, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 306 days.

(21) Appl. No.: 17/876,262

(22) Filed: Jul. 28, 2022

(65) Prior Publication Data

US 2023/0043582 A1    Feb. 9, 2023

(30) Foreign Application Priority Data

Aug. 9, 2021  (KR) .................. 10-2021-0104531

(51) Int. Cl.
| | |
|---|---|
| *B62D 21/03* | (2006.01) |
| *B60K 15/03* | (2006.01) |
| *B60K 15/063* | (2006.01) |
| *B60K 15/07* | (2006.01) |
| *B62D 27/06* | (2006.01) |

(52) U.S. Cl.
CPC .............. *B62D 21/03* (2013.01); *B60K 15/07* (2013.01); *B62D 27/065* (2013.01); *B60K 2015/03118* (2013.01); *B60K 2015/03315* (2013.01); *B60K 2015/0634* (2013.01)

(58) Field of Classification Search
CPC ...... F17C 2270/0171; F17C 2270/0168; F17C 2205/01; B60K 15/067; B60K 15/03006; B60K 15/07; B60K 2015/0636; B60K 2015/03164; Y02E 60/32
See application file for complete search history.

(56) References Cited

U.S. PATENT DOCUMENTS

2020/0239076 A1*  7/2020  Milton ................. B62D 21/02

FOREIGN PATENT DOCUMENTS

| | | | | |
|---|---|---|---|---|
| DE | 102018117356 A1 * | 1/2020 | .............. | B60K 1/00 |
| DE | 102019119074 A1 * | 1/2021 | | |
| JP | 2006302802 A | 11/2006 | | |

OTHER PUBLICATIONS

Espace translation of DE 10 2019 119074 A1 (Year: 2019).*
Espace translation of DE 10 2018 117356 A1 (Year: 2018).*

* cited by examiner

*Primary Examiner* — Jason D Shanske
*Assistant Examiner* — Scott Lawrence Strickler
(74) *Attorney, Agent, or Firm* — SLATER MATSIL, LLP

(57) ABSTRACT

An embodiment structure for mounting hydrogen storage tanks for a vehicle includes a chassis frame including a first frame and a second frame spaced apart from each other and a cutting area, and a hydrogen storage tank assembly inserted into the cutting area in a height direction of the chassis frame and configured to support at least one hydrogen storage tank, wherein the hydrogen storage tank assembly includes a first member and a second member each being fastened to the chassis frame.

16 Claims, 5 Drawing Sheets

STRUCTURE FOR MOUNTING HYDROGEN STORAGE TANKS FOR VEHICLE

CROSS-REFERENCE TO RELATED APPLICATIONS

This application claims the benefit of Korean Patent Application No. 10-2021-0104531, filed on Aug. 9, 2021, which application is hereby incorporated herein by reference.

TECHNICAL FIELD

The present disclosure relates to a structure for mounting hydrogen storage tanks for a vehicle.

BACKGROUND

In general, an internal-combustion engine car is driven by its explosive power generated by combusting fossil fuel and oxygen in the air within an engine. In contrast, a fuel cell car is driven using electrical energy generated by an electrochemical reaction between hydrogen supplied through a high pressure hydrogen tank or a reformer and oxygen in the air, which is supplied through an air compressor, within a fuel cell stack.

It is very important to make more safe and compact hydrogen, that is, fuel used in such a fuel cell car, and to carry (or transport) or store hydrogen. Among several methods therefor, there is a method of making gaseous hydrogen into liquid hydrogen or making hydrogen absorbed by an absorption alloy. Such a method has a problem, such as natural evaporation or the amount of absorption, which cannot be solved by a current technology. Accordingly, the use of a light-weight and high pressure tank (also called a bomb) is the trend.

If the high pressure tank is used, in general, hydrogen filled within the high pressure tank needs to be compressed to high pressure of 350 bar or higher in terms of practicality based on the securement of a riding space and sufficient mileage according to the volume of the high pressure tank.

Furthermore, recently, with the development of an autonomous vehicle, the development of a commercial vehicle using a fuel cell-driven vehicle is accelerated. A structure fastened to a cargo box on which a container is mounted and to a drone vehicle fastened to the cargo box to perform autonomous driving is developed.

Despite such a structure, a fuel cell-driven vehicle essentially requires a stable mounting structure for a hydrogen storage tank. Furthermore, a commercial vehicle essentially requires a construction of a hydrogen storage tank fixed to a location having improved maintainability.

Japanese Patent Application Publication No. 2006-302802 (Nov. 2, 2006) provides information related to the subject matter of the present disclosure.

SUMMARY

The present disclosure relates to a structure for mounting hydrogen storage tanks for a vehicle. Particular embodiments relate to a structure for mounting hydrogen storage tanks that fastens the hydrogen storage tanks to a chassis frame for a commercial vehicle in the commercial vehicle on which an autonomous drone including a fuel cell driving unit can be selectively mounted.

Embodiments of the present disclosure can solve problems associated with the related art, and an embodiment of the present disclosure provides a hydrogen storage tank assembly fastened to a chassis frame by providing a structure for mounting hydrogen storage tanks for a vehicle.

Furthermore, an embodiment of the present disclosure provides a structure for mounting hydrogen storage tanks for a vehicle that can be easily detachable by providing a hydrogen storage tank assembly that may be fastened in accordance with a shape of a chassis frame including a rear axle.

Embodiments of the present disclosure are not limited to the aforementioned embodiments, and other embodiments of the present disclosure not described above may be understood from the following description and may be more evidently understood from described embodiments of the present disclosure. Furthermore, embodiments of the present disclosure may be realized by means described in the claims and a combination of them.

A structure for mounting hydrogen storage tanks for a vehicle for achieving the embodiments of the present disclosure includes the following elements.

As an embodiment of the present disclosure, there is provided a structure for mounting hydrogen storage tanks for a vehicle, including a chassis frame including a first frame and a second frame spaced apart from each other, and a hydrogen storage tank assembly including a first member and a second member spaced apart from each other and disposed in the height direction of a center member and having at least one hydrogen storage tank disposed thereon. The chassis frame includes a cutting area configured so that the hydrogen storage tank assembly is inserted into the cutting area in the height direction. Each of the first member and the second member is configured to be fastened to the chassis frame.

Furthermore, there is provided the structure for mounting hydrogen storage tanks for a vehicle, further including a rear axle disposed in the chassis frame.

Furthermore, there is provided the structure for mounting hydrogen storage tanks for a vehicle, wherein a width between the first frame and the second frame including the rear axle is configured to be narrower than a width between the first frame and the second frame in which the hydrogen storage tank assembly is disposed.

Furthermore, there is provided the structure for mounting hydrogen storage tanks for a vehicle, further including at least one reinforcement member disposed at both ends where the hydrogen storage tank assembly is fastened to the chassis frame.

Furthermore, there is provided the structure for mounting hydrogen storage tanks for a vehicle, wherein the first member at the top in the height direction is fastened to the inside of the chassis frame.

Furthermore, there is provided the structure for mounting hydrogen storage tanks for a vehicle, wherein the second member disposed at the bottom in the height direction is fastened to one surface at the bottom of the chassis frame.

Furthermore, there is provided the structure for mounting hydrogen storage tanks for a vehicle, wherein the hydrogen storage tank assembly includes two columns of hydrogen storage tanks each fastened to the first member and the second member spaced apart from each other in the height direction.

Furthermore, there is provided the structure for mounting hydrogen storage tanks for a vehicle, wherein the chassis frame further includes a variable frame configured to enable the chassis frame to be fastened to a chassis frame of another adjacent vehicle.

Embodiments of the present disclosure may have the following effects by a coupling and use relation between the present embodiments and a construction to be described hereinafter.

Embodiments of the present disclosure provide an effect of making maintenance easy by providing the hydrogen storage tank assembly selectively detachable on the chassis frame of a commercial vehicle.

Furthermore, embodiments of the present disclosure have an effect in that they prevent the deformation of the chassis frame by providing sufficient stiffness to the chassis frame on which the hydrogen storage tank assembly is mounted.

Figure 1:
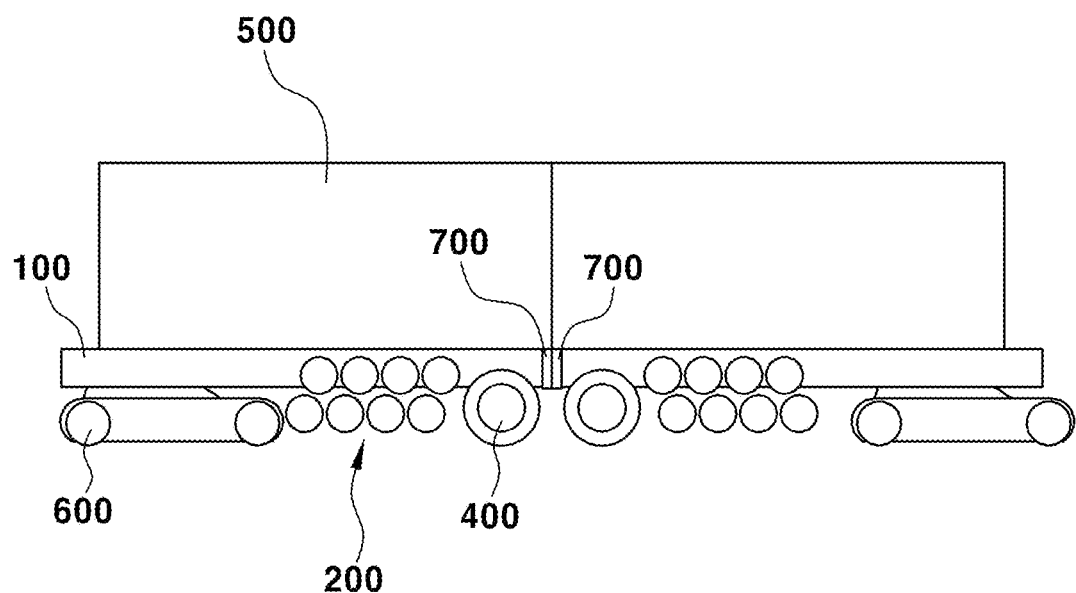
FIG. 1 illustrates a side view of a commercial vehicle including a structure for mounting hydrogen storage tanks for a vehicle as an embodiment of the present disclosure.

The following elements may be used in connection with the drawings in describing embodiments of the present disclosure.

10: vehicle
100: chassis frame
110: first frame
120: second frame
130: cutting area
200: hydrogen storage tank assembly
210: first member
220: second member
230: center member
240: hydrogen storage tank
300: reinforcement member
400: rear axle
500: cargo box
600: drone
700: variable frame

DETAILED DESCRIPTION OF ILLUSTRATIVE EMBODIMENTS

Hereinafter, embodiments of the present disclosure are described in detail with reference to the accompanying drawings. Embodiments of the present disclosure may be modified in various forms, and the scope of the present disclosure should not be construed as being limited to the following embodiments. The present embodiments are provided to a person having ordinary knowledge in the art to more fully describe the present disclosure.

Furthermore, a term, such as " . . . member", " . . . assembly", or " . . . vehicle" described in this specification, means a unit in which at least one function or operation is processed, and may be implemented by hardware or software or a combination of hardware and software.

Furthermore, in this specification, the reason why the names of elements are divided into a first, a second, etc. is for distinguishing between the elements because they have the same name, and the elements are not necessarily limited to orders thereof in the following description.

Hereinafter, embodiments are described in detail with reference to the accompanying drawings. In describing the embodiments with reference to the accompanying drawings, the same or corresponding element is assigned the same reference numeral, and a redundant description thereof is omitted.

Embodiments of the present disclosure relate to a structure for mounting hydrogen storage tanks 240 for a vehicle 10, and relates to a structure for mounting the hydrogen storage tanks 240 for a commercial vehicle 10 which is driven by the driving power of a drone 600 that performs autonomous driving in the commercial vehicle 10 including a cargo box 500.

The drone 600 may be selectively fastened to a chassis frame 100 including the cargo box 500, and may be configured to be coupled to a hydrogen storage tank assembly 200 mounted on the chassis frame 100 by a fluid and to be applied with a driving power through a fuel cell.

More preferably, the drone 600 may be fastened under the chassis frame 100 of the vehicle 10, and may be driven by the driving power applied through a chemical reaction of the fuel cell. The drone 600 may mean a driving device in which an autonomous driving environment, such as a radar and a LiDAR, has been configured.

Figure 2:
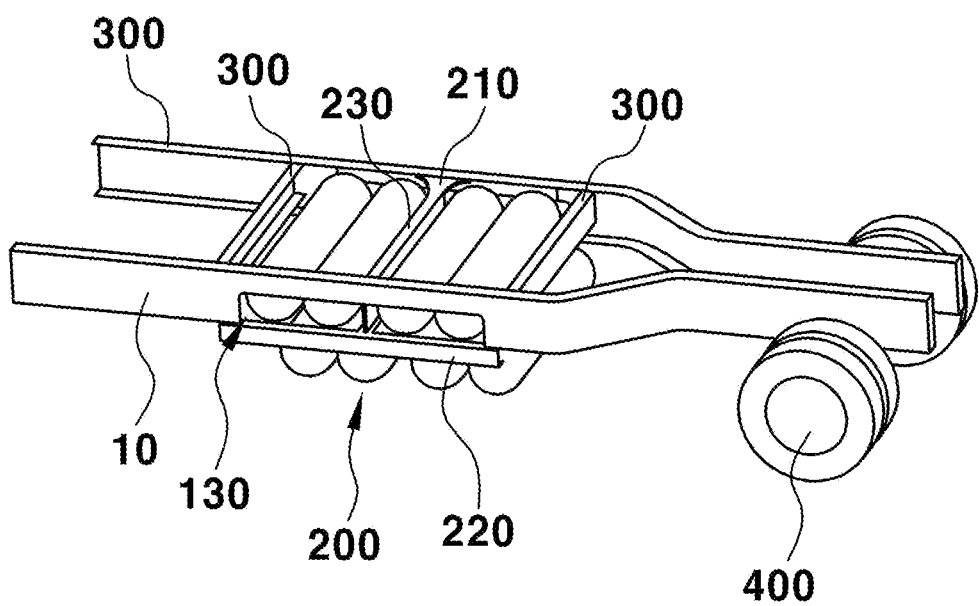
FIG. 2 illustrates a perspective view of a commercial vehicle including a structure for mounting hydrogen storage tanks for a vehicle as an embodiment of the present disclosure.
Figure 3:
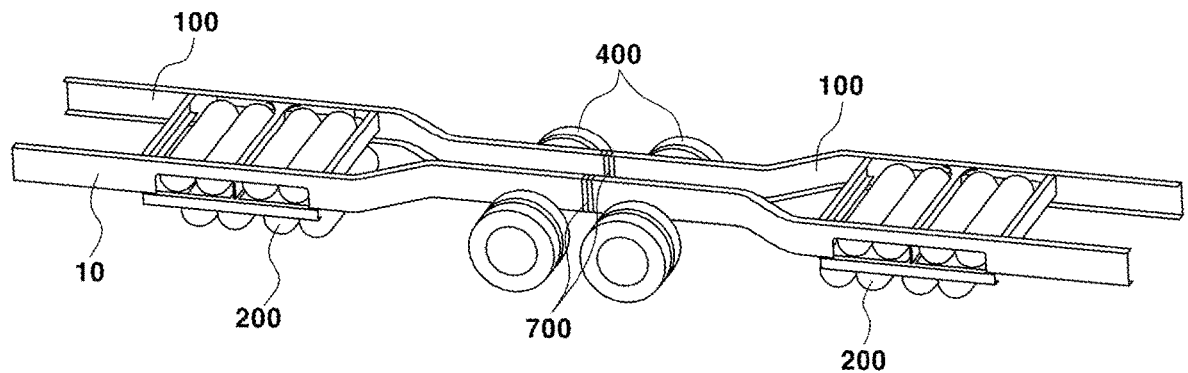
FIG. 3 illustrates, in a perspective view form, a structure for mounting hydrogen storage tanks for a commercial vehicle to which a chassis frame of another adjacent vehicle is fastened as an embodiment of the present disclosure.

FIGS. 1 to 3 illustrate the commercial vehicle 10 including a structure for mounting the hydrogen storage tanks 240 as embodiments of the present disclosure.

As illustrated, the cargo box 500 may be disposed at the top of the chassis frame 100. The chassis frame 100 is configured so that the drone 600 capable of performing autonomous driving is mounted on one end of the chassis frame 100 in a driving direction of the vehicle. The drone 600 may be disposed at one end of both ends of the chassis frame 100 or may be disposed at both ends of the chassis frame 100.

As an embodiment of the present disclosure, the chassis frame 100 may be configured to include a variable frame 700 at the other end to which the drone 600 is fastened. The variable frame 700 may be selectively fastened to a variable frame 700 of another adjacent vehicle. Accordingly, the vehicle 10 may be configured so that the cargo box 500 is selectively expanded.

A rear axle 400 may be fastened at a bottom adjacent to the other end of the chassis frame 100 in which the variable frame 700 is disposed. The rear axle 400 is configured to be selectively in contact with the ground, and may be configured to have a height controlled in accordance with weight of the cargo box 500. More preferably, the rear axle 400 may be controlled to selectively have a ground connection with the ground depending on weight of the cargo box 500.

Furthermore, the rear axle 400 is disposed between the variable frame 700 and a cutting area 130 of the chassis frame 100 where the hydrogen storage tank assembly 200 is disposed. One end of the chassis frame 100 including the rear axle 400 includes the variable frame 700. The variable frame 700 may be selectively fastened to an adjacent variable frame 700. Accordingly, the cargo box 500 of the vehicle 10 can be additionally fastened.

The chassis frame 100 in which the rear axle 400 is disposed may be configured to have a narrow interval compared to another area. More preferably, an interval of the chassis frame 100 including a first frame no and a second frame 120 may be different depending on a location in the length direction of the chassis frame mo. An interval between the first frame 110 and second frame 120 of the chassis frame 100 in which the rear axle 400 is disposed is configured to have a relatively narrower width than an interval between the first frame no and second frame 120 of another area.

The first frame 110 and the second frame 120 may be configured to face each other in the length direction of the chassis frame 100. The chassis frame 100 may include multiple members for fixing the first frame no and the second frame 120. Furthermore, the first frame no and the second frame 120 may be configured to have cross sections of "⊏" shapes in which opening parts thereof face each other, respectively, so that the first frame no and the second frame 120 are fastened to the top and the bottom extended in the width direction of a first member 210 and a second member 220 that constitute the hydrogen storage tank assembly 200.

The hydrogen storage tank assembly 200 includes the first member 210 disposed at the top of a center member 230 disposed in the height direction of the vehicle 10 and disposed between the first frame no and the second frame 120, and the second member 220 disposed at the bottom of the center member 230. That is, the center member 230 may include the first frame no and the second frame 120 extended and disposed in the width direction of the chassis frame 100 and disposed at both ends thereof in the length direction of the chassis frame 100. The first frame 110 and the second frame 120 may be configured as a pair at both ends of the center member 230.

The center member 230 is disposed in the width direction of the hydrogen storage tank assembly 200, and provides an effect of reinforcing torsional rigidity upon driving of a vehicle. Furthermore, the center member 230 can provide an effect of reinforcing torsional rigidity of the hydrogen storage tank assembly 200 on which the hydrogen storage tanks 240 are mounted.

As described above, the center member 230 of the hydrogen storage tank assembly 200 is disposed between the first frame no and the second frame 120, and provides an effect which can reinforce torsional rigidity of the chassis frame.

At least one hydrogen storage tank 240 is configured to be disposed in the space between the first frame no and the second frame 120 and in two columns under the second frame 120. More preferably, multiple hydrogen storage tanks 240 are configured in a way to be fastened and fixed to at least one of the first frame no or the second frame 120.

The hydrogen storage tank assembly 200 may be inserted and fixed to a location corresponding to the cutting area 130 of the chassis frame 100. More preferably, the first member 210 is disposed to face a side at the top of the chassis frame 100. The top of the second member 220 is moved and fixed at a location that faces the rear of the chassis frame 100.

Figure 4A:
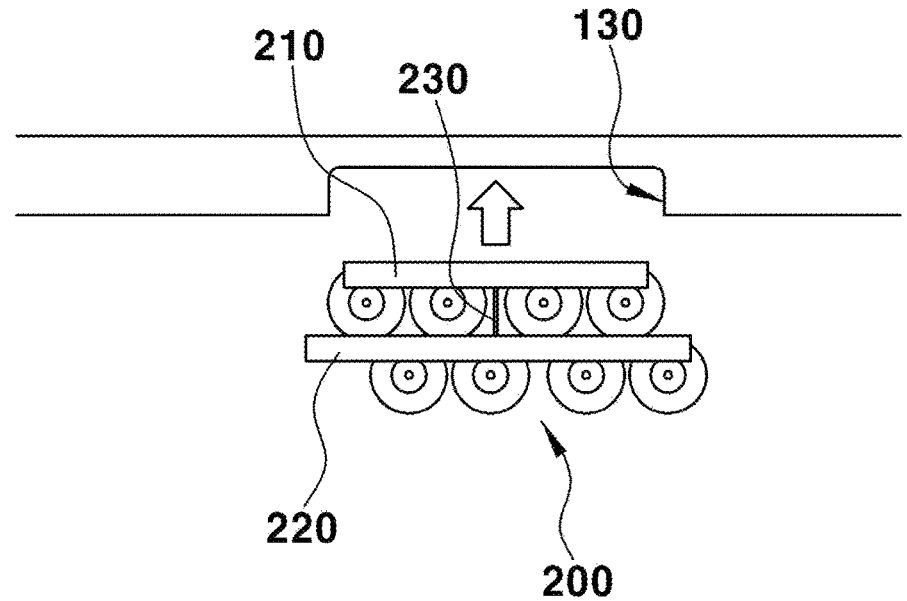
FIG. 4A illustrates a fastening structure of a commercial vehicle including a structure for mounting hydrogen storage tanks for a vehicle as an embodiment of the present disclosure.
Figure 4B:
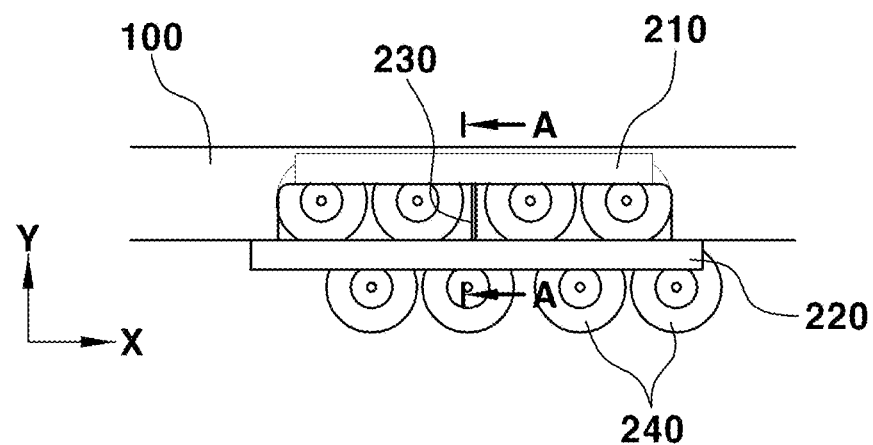
FIG. 4B illustrates a side view of a vehicle to which a structure for mounting hydrogen storage tanks for a vehicle has been applied as an embodiment of the present disclosure.

FIGS. 4A and 4B illustrate constructions in which the hydrogen storage tank assembly 200 is inserted and fixed to the cutting area 130 of the chassis frame 100 as an embodiment of the present disclosure.

As illustrated, the cutting area 130 of the chassis frame 100 is configured to be disposed at the bottom of the chassis frame 100. More preferably, the cutting area 130 is configured in a depressed form under the first frame no and the second frame 120.

The hydrogen storage tank assembly 200 is configured to include both sides corresponding to the cutting area 130. More preferably, the first member 210 disposed across both sides of the hydrogen storage tank assembly 200 is configured to be inserted into the cutting area 130 formed at both ends of the chassis frame 100. The second member 220 is configured to neighbor the bottom of the cutting area 130.

The first member 210 and the second member 220 may be inserted and disposed into the cutting area 130. The first member 210 and the second member 220 are configured to reinforce an area whose bending stiffness may be weakened due to frame cutting.

As illustrated in FIG. 4B, when a side cross-sectional view of the chassis frame 100 is viewed, the first member 210 inserted into the cutting area 130 may be inserted and fixed into the chassis frame 100 at a location facing the side of the chassis frame 100. Furthermore, the second member 220 may be moved and fixed to a location neighboring the rear of the chassis frame 100.

Furthermore, two columns of the hydrogen storage tanks 240 may be disposed in the first member 210 and the second member 220 in the height direction thereof. Each of the hydrogen storage tanks 240 is configured to be fastened to the first member 210 or the second member 220.

Figure 5A:
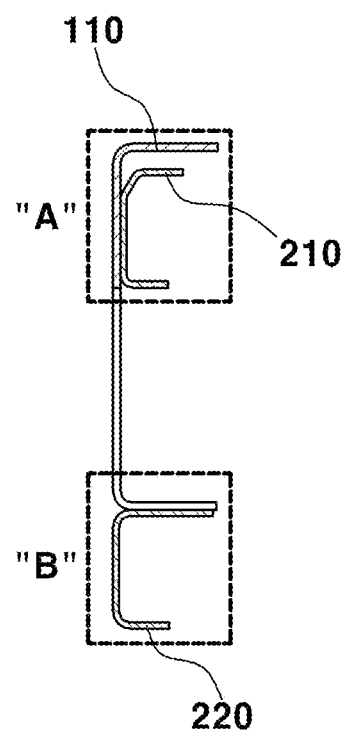
FIG. 5A illustrates a fastening relation between a chassis frame and a hydrogen storage tank assembly in a structure for mounting hydrogen storage tanks for a vehicle as an embodiment of the present disclosure.
Figure 5B:
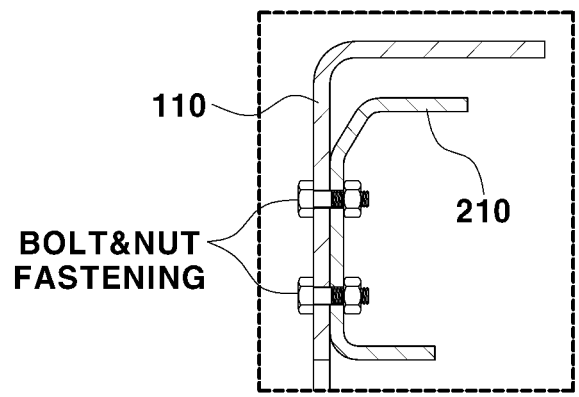
FIG. 5B illustrates a fastening relation between a first frame and a hydrogen storage tank assembly in a structure for mounting hydrogen storage tanks for a vehicle as an embodiment of the present disclosure.
Figure 5C:
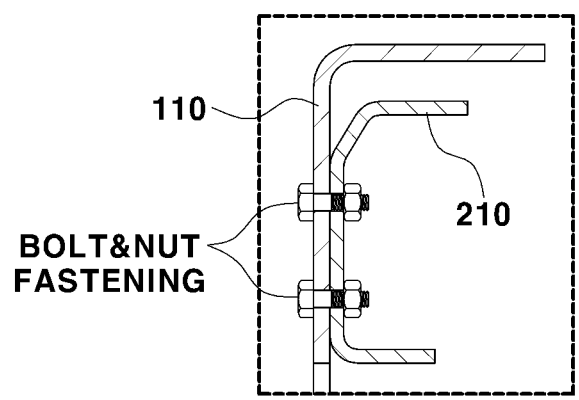
FIG. 5C illustrates a fastening relation between a second frame and a hydrogen storage tank assembly in a structure for mounting hydrogen storage tanks for a vehicle as an embodiment of the present disclosure.

FIG. 5A illustrates a cross-section view of a construction in which the chassis frame 100 and the first member 210 and the second member 220 are fastened together. FIG. 5B illustrates a fastening relation between the chassis frame 100 and the first member 210. FIG. 5C illustrates a fastening structure between the chassis frame 100 and the second member 220.

In the illustrated construction, a coupling relation between the first frame 110, and the first member 210 and the second member 220 are illustrated as a target. A coupling relation between the second frame 120, and the first member 210 and the second member 220 may also be configured to have the same structure.

As illustrated in FIG. 5A, the first member 210 is inserted into the chassis frame 100 along the cutting area 130, and is additionally moved to an area neighboring the inside of the chassis frame 100. That is, the first member 210 is moved to a location neighboring the inside of the first frame no and the second frame 120. Furthermore, the second member 220 is configured to be inserted into a location neighboring the bent bottom of the chassis frame 100.

FIG. 5B illustrates the fastening relation between the chassis frame 100 and the first member 210. The chassis frame 100 and the first member 210 include at least one hole formed in the height direction thereof, and are configured to have a bolt-nut fastening structure through the hole.

Accordingly, an effect in that a movement of the hydrogen storage tank assembly 200 in the height direction along the chassis frame 100 is prevented can be provided.

Furthermore, as illustrated in FIG. 5C, the second member 220 is fastened to the rear of the chassis frame 100. The second member 220 is configured to extend to both ends in the length direction of the cutting area 130, and is disposed to neighbor the rear of the chassis frame 100 disposed outside the cutting area 130.

Furthermore, the rear of the chassis frame 100 neighboring the top of the second member 220 is configured to be fixed. More preferably, bolt-nut fixing may be performed on the chassis frame 100 neighboring the top of the second member 220, which may limit a movement of the hydrogen storage tank assembly 200 in the width direction.

Figure 6:
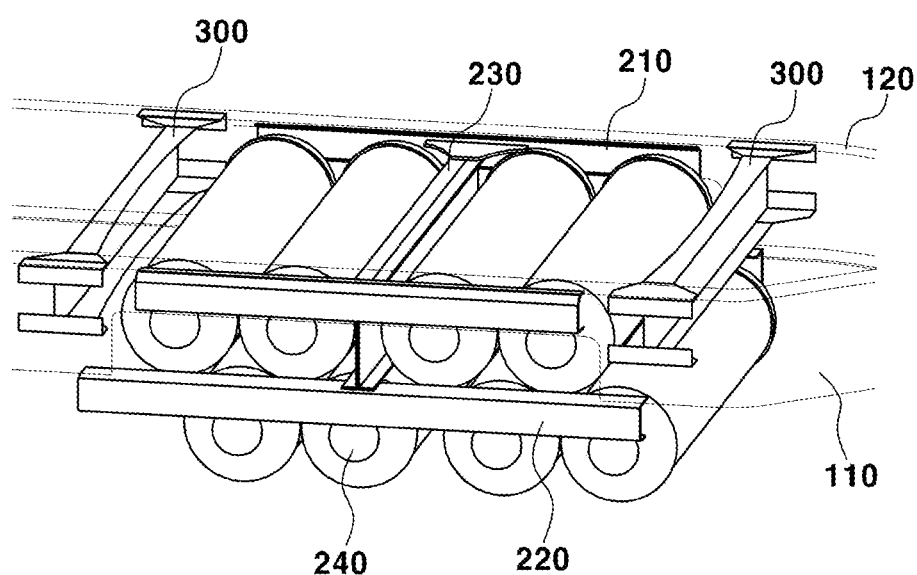
FIG. 6 illustrates a vehicle to which a reinforcement member of a structure for mounting hydrogen storage tanks for a vehicle has been applied as an embodiment of the present disclosure.

FIG. 6 illustrates a construction of the chassis frame 100 on which the hydrogen storage tank assembly 200 is mounted as an embodiment of the present disclosure.

The first member 210 and the second member 220 disposed in the height direction of the center member 230 are configured to be fixed to the chassis frame 100. Furthermore, a reinforcement member 300 fixed to the chassis frame 100 may be further provided on both sides in the length direction in which the hydrogen storage tank assembly 200 is disposed.

The reinforcement member 300 is spaced apart from the first member 210 and the second member 220 in the length direction in a way to have a given interval from the first member 210 and the second member 220, and is fixed and disposed in the first frame 110 and the second frame 120. That is, in order to prevent the sagging of the cutting area 130 on which the hydrogen storage tank assembly 200 is mounted and to reinforce stiffness of the cutting area 130, at least one reinforcement member 300 is disposed in the width direction of the chassis frame 100.

The above detailed description illustrates embodiments of the present disclosure. Furthermore, the aforementioned description illustrates preferred embodiments of the present disclosure, and the present disclosure may be used in various other combinations, changes and environments. That is, the present disclosure may be changed or modified within the range of a concept of the invention disclosed in this specification, the scope of the disclosure contents and equivalent scopes thereof and/or the range of technology or knowledge in the art. The aforementioned embodiments describe the best state for implementing the technical spirit of the present disclosure, and may include various changes required for a detailed application field and use of the present disclosure. Accordingly, the detailed description of the present disclosure is not intended to restrict the present disclosure to the disclosed implementation state. Furthermore, the appended claims should be interpreted as including other implementation states.

What is claimed is:

1. A structure for mounting hydrogen storage tanks for a vehicle, the structure comprising:
a chassis frame comprising a first frame and a second frame spaced apart from each other, the chassis frame further comprising a cutting area disposed at a bottom of the chassis frame; and
a hydrogen storage tank assembly inserted into the cutting area in a height direction of the chassis frame and configured to support at least one hydrogen storage tank, wherein the hydrogen storage tank assembly comprises a first member and a second member each being fastened to the chassis frame,
wherein:
the first member is configured to be inserted into the cutting area and is fastened to an inside of the chassis frame, and
the second member is fastened to one surface at the bottom of the chassis frame.

2. The structure of claim 1, further comprising a rear axle at the bottom of the chassis frame.

3. The structure of claim 2, wherein a width between the first frame and the second frame in a region near the rear axle is narrower than a width between the first frame and the second frame in a region in which the hydrogen storage tank assembly is disposed.

4. The structure of claim 1, further comprising a reinforcement member disposed at both ends where the hydrogen storage tank assembly is fastened to the chassis frame.

5. The structure of claim 1, wherein the hydrogen storage tank assembly comprises two columns of hydrogen storage tanks each fastened to the first member and the second member spaced apart from each other in the height direction.

6. The structure of claim 1, wherein the chassis frame further comprises a variable frame configured to fasten the chassis frame to a second chassis frame of an adjacent vehicle.

7. The structure of claim 1, further comprising a center member disposed in a height direction of the first member and the second member.

8. A vehicle comprising:
a chassis frame comprising a first frame and a second frame spaced apart from each other, the chassis frame further comprising a cutting area disposed at a bottom of the chassis frame;
a drone fastened under the chassis frame at a first end of the chassis frame; and
a hydrogen storage tank assembly inserted into the cutting area in a height direction of the chassis frame, wherein the hydrogen storage tank assembly comprises a first member and a second member each fastened to the chassis frame,
wherein:
the first member is configured to be inserted into the cutting area and is fastened to an inside of the chassis frame, and
the second member is fastened to one surface at the bottom of the chassis frame.

9. The vehicle of claim 8, further comprising a rear axle fastened at the bottom of the chassis frame at a second end of the chassis frame, the second end being opposite the first end.

10. The vehicle of claim 9, wherein a width between the first frame and the second frame toward the second end of the chassis frame is narrower than a width between the first frame and the second frame in a region of the cutting area.

11. The vehicle of claim 8, further comprising a first reinforcement member fastened to the chassis frame adjacent a first end of the hydrogen storage tank assembly and a second reinforcement member fastened to the chassis frame adjacent a second end of the hydrogen storage tank assembly.

12. The vehicle of claim 8, wherein the hydrogen storage tank assembly comprises two columns of hydrogen storage tanks each fastened to the first member or the second member.

13. The vehicle of claim 8, wherein the chassis frame further comprises a variable frame configured to fasten the chassis frame to a second chassis frame of an adjacent vehicle.

14. The vehicle of claim 8, further comprising a center member disposed in a height direction of the first member and the second member.

15. The vehicle of claim 8, further comprising a cargo box disposed at a top of the chassis frame.

16. A structure for mounting hydrogen storage tanks for a vehicle, the structure comprising:
   a chassis frame comprising:
      a first frame and a second frame spaced apart from each other, wherein a width between the first frame and the second frame is narrower at a first end of the chassis frame than a width between the first frame and the second frame at a second end of the chassis frame;
      a cutting area disposed at a bottom of the chassis frame; and
      a variable frame disposed at the first end of the chassis frame;
   a rear axle fastened at the bottom of the chassis frame at the first end of the chassis frame in a region between the cutting area and the variable frame;
   a drone mounted at the second end of the chassis frame; and
   a hydrogen storage tank assembly disposed in the cutting area in a height direction of the chassis frame and configured to support at least one hydrogen storage tank, wherein the hydrogen storage tank assembly comprises:
      a center member disposed in a height direction of the vehicle;
      a first member disposed at a top of the center member and fastened to the bottom of the chassis frame; and
      a second member disposed at a bottom of the center member and fastened to the chassis frame,
   wherein:
      the first member is configured to be inserted into the cutting area and is fastened to an inside of the chassis frame, and
      the second member is fastened to one surface at the bottom of the chassis frame.

\* \* \* \* \*